UNITED STATES PATENT OFFICE.

WILLIAM WRIGHT, OF NEW YORK, N. Y., ASSIGNOR TO THE COLUMBIAN ELECTRIC LIGHT, POWER, HEAT, AND MANUFACTURING COMPANY, OF NEW JERSEY.

BATTERY COMPOUND.

SPECIFICATION forming part of Letters Patent No. 484,385, dated October 11, 1892.

Application filed December 2, 1891. Serial No. 413,820. (No specimens.)

*To all whom it may concern:*

Be it known that I, WILLIAM WRIGHT, a citizen of the United States, and a resident of New York, county and State of New York, have invented certain new and useful Improvements in Battery Compounds, of which the following is a specification.

My invention relates to battery compounds, and has for its object the provision of a new dry-battery compound, whereby a durable and constant electro-motive force may be secured at a comparatively-small cost.

The subject-matter of this application relates, broadly speaking, to a dry chemical sand or granular composition and the process of making the same, which consists in subjecting sulphuric acid containing a metallic oxide and a chromium compound to a temperature of 275° Fahrenheit for, say, fifteen minutes, and then spreading the same upon a plate cooled to 60° Fahrenheit to become dry and granular.

To attain the desired end my invention consists in the new article of manufacture and method of preparation of the same, hereinafter described and claimed.

I manufacture the compound according to the following formula, (all parts being by weight,) namely: I first take fifteen parts of sulphate of potash and thirty parts of water and boil the same until the sulphate of potash is dissolved. I then add five parts of black oxide of manganese and stir well, and afterward add seven and one-half parts of sulphuric acid. I boil this mixture for fifteen minutes, and then add twenty parts of bichromate of soda, and boil and stir the same well until dissolved, when I add seven and one-half parts of sulphuric acid and boil for twenty minutes, and then add thirty parts of bichromate of soda. I boil this mixture for ten minutes and add thirty parts of sulphuric acid, and I then bring the heat to 275° Fahrenheit for, say, fifteen minutes, until the water is evaporated, after which I spread the resultant compound upon a sheet of lead cooled to 60° Fahrenheit to dry.

It is obvious that a number of compositions may be made according to my boiling process, herein set forth, which will be equally dry and granular, the essential features of my said process being the subjecting of sulphuric acid containing a metallic oxide and a chromium compound to a high degree of heat, whereby the composition may be boiled and the water evaporated, and then of spreading the same upon a plate to become dry and granular.

This compound is designed for use in galvanic batteries of either the single solution or porous cup varieties, and may also be used in that style ordinarily designated as the "dry battery."

In cases where battery solutions are desired, my compound may be dissolved in water.

My compound is thus easily applied and the battery which it is used to charge may be taken care of without trouble, there being no handling of acids, &c. There is also no crystalline formation formed. Neither is there undue polarization nor unnecessary consumption of zinc.

What I claim as new, and desire to secure by Letters Patent, is—

The process of making a dry chemical sand or granular composition, which consists in subjecting sulphuric acid containing a metallic oxide and a chromium compound to a temperature of 275° Fahrenheit for fifteen minutes and then spreading the same upon a plate cooled to 60° Fahrenheit to become dry and granular.

In testimony of the foregoing specification I do hereby sign the same in the city, county, and State of New York, this 24th day of November, A. D. 1891.

WILLIAM WRIGHT.

Witnesses:
   J. ODELL FOWLER, Jr.,
   JULIUS HIRSHFELD.